United States Patent
Choi et al.

(10) Patent No.: US 7,254,117 B2
(45) Date of Patent: Aug. 7, 2007

(54) CLOSED-LOOP POWER CONTROL APPARATUS FOR MOBILE SATELLITE COMMUNICATION SYSTEM AND METHOD THEREOF

(75) Inventors: Kwon-Hue Choi, Daejon (KR); Kwang-Jae Lim, Daejon (KR); Soo-Young Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 661 days.

(21) Appl. No.: 10/493,158

(22) PCT Filed: Oct. 21, 2002

(86) PCT No.: PCT/KR02/01973

§ 371 (c)(1),
(2), (4) Date: Apr. 14, 2004

(87) PCT Pub. No.: WO03/036823

PCT Pub. Date: May 1, 2003

(65) Prior Publication Data

US 2004/0246928 A1     Dec. 9, 2004

(51) Int. Cl.
*H04B 7/185* (2006.01)
(52) U.S. Cl. .................. 370/318; 370/335; 455/522
(58) Field of Classification Search ............ 370/318, 370/335, 342; 455/69, 522
See application file for complete search history.

(56) References Cited

U.S. PATENT DOCUMENTS

| | | | |
|---|---|---|---|
| 4,261,054 A | 4/1981 | Scharla-Nielsen | |
| 5,619,525 A | 4/1997 | Wiedeman et al. | |
| 5,828,335 A | 10/1998 | Al-Dhahir et al. | |
| 5,835,847 A | 11/1998 | Gilmore et al. | |
| 5,982,760 A | 11/1999 | Chen | |
| 6,075,974 A | 6/2000 | Saints et al. | |
| 6,147,981 A | 11/2000 | Prescott | |
| 6,240,124 B1 | 5/2001 | Wiedeman et al. | |
| 6,298,073 B1 | 10/2001 | LeFever | |
| 6,396,867 B1 | 5/2002 | Tiedemann, Jr. et al. | |

FOREIGN PATENT DOCUMENTS

EP     1117193     7/2001

(Continued)

OTHER PUBLICATIONS

Hyuk Joon Kwon e tal., "Performance of an Adaptive Fuzzy Rule-based . . . Communication Systems", 1999 IEEE Tencon (pp. 27-30).

(Continued)

*Primary Examiner*—Lee Nguyen
(74) *Attorney, Agent, or Firm*—Blakely Sokoloff Taylor & Zafman

(57) ABSTRACT

Apparatus and method for closed-loop power control in mobile satellite communication system, which can compensate round trip delay. The apparatus for closed-loop power control includes the means of; a) converting power control order from base earth station into power control step; b) measuring channel change rate from power of pilot channel; c) making tab coefficient using said channel change rate; d) compensating channel change due to loop delay using power control step; and e) renovating received signal power using said power control step.

26 Claims, 3 Drawing Sheets

FOREIGN PATENT DOCUMENTS

| | | |
|---|---|---|
| JP | 2000-307512 | 11/2000 |
| KR | 000047215 | 7/2000 |
| KR | 10020010037057 | 5/2001 |
| WO | WO 00/74261 A1 | 12/2000 |

OTHER PUBLICATIONS

Fredrik Gunnarsson et al., "Time Delay Compensation for CDMA Power Control", 0-7803-6451-1/00/ © 2000 IEEE (pp. 1504-1508).

Fredrik Gunnarsson et al., "Power Control With Time Delay Compensation", 0-7803-6507-0/00 © 2000 IEEE (pp. 646-653).

Giuseppe Caire et al., "Optimum Power Control Over Fading Channels", 0018-9448/99 © 1999 IEEE.

Jyh-Hong Wen et al., "Short-Term Fading Prediction-based Power Control . . . Mobile Radio Networks", 0-7803-3871-5/97 © IEEE.

Kwonhue Choi, "Closed Loop Power Control Algorithms for IMT 2000 Satellite Components", IMT 2000 (4 pp.).

International Telecommunications Union, Radiocommunications Study Groups, "Section 6 . . . 3.3.4 in Recommendation ITU-R M. 1347" Delayed Contribution Document 8D/218-E, Oct. 19, 2001 (38 pp.).

CLOSED-LOOP POWER CONTROL APPARATUS FOR MOBILE SATELLITE COMMUNICATION SYSTEM AND METHOD THEREOF

The present patent application is a non-provisional application of International Application No. PCT/KR02/01973, filed Oct. 21, 2002.

TECHNICAL FIELD

The present invention relates to a closed-loop power control apparatus, a method thereof, and a computer-readable recording medium for recording a program that implements the method; and, more particularly, to a closed-loop power control apparatus which controls transmit power based on the power control command from a receiver to maintain a signal-to-noise ratio (SNR) at a desired value in a Code Division Multiple Access (CDMA) mobile communication system, a method thereof, and a computer-readable recording medium for recording a program that implements the method.

BACKGROUND ART

Generally, closed-loop power control is performed to maintain a signal-to-noise ratio (SNR) at a target value determined in a system. To perform a closed-loop power control, a receiver generates a power control command by comparing a received power or signal-to-noise ratio with the target value, and transmits the power control command to a transmitter. The transmitter controls the transmit power based on the power control command.

Power control technology of a Satellite Code Division Multiple Access (SAT-CDMA) mobile communication system is suggested as one of satellite transmission standards for an International Mobile Telecommunication-2000 (IMT-2000) system. It includes both of the up-link and down-link closed loop power control and the up-link open loop power control.

In the SAT-CDMA mobile communication system, the round trip delay (RTD) time taken for a power control command generated in a base station to be reflected on the received power of the base station is very long compared to a terrestrial system. When the RTD time is longer than a power control command period in the SAT-CDMA mobile communication system, power error compensation performance and loop stability become deteriorated.

To overcome the above problem caused by the long RTD time, Saints et al. suggest a power control in U.S. Pat. No. 6,075,914, entitled "Method and Apparatus for Adjusting Thresholds and Measurement of Received Signals by Anticipating Power Control Commands Yet to Be Executed." In the U.S. Pat. No. 6,075,914, Saints teaches the technology that estimates a received power after the RTD time by considering the RTD time taken for the present power control command to be reflected on the received power, and generates a power control command based on the estimated received power after the RTD time. The power control method, however, does not solve the problem that the communication system is deteriorated by the alteration of a channel during the RTD time.

DISCLOSURE OF INVENTION

It is, therefore, an object of the present invention to provide a closed-loop power control apparatus that can overcome deterioration of power control which is generated when a round trip delay (RTD) time is longer than a power control command period in a closed-loop power control of a satellite Code Division Multiple Access (SAT-CDMA) mobile communication system.

It is another object of the present invention to provide a closed-loop power control method that can overcome deterioration of power control which is generated when a RTD time is longer than a power control command period in a closed-loop power control of the SAT-CDMA mobile communication system.

It is another object of the present invention to provide a computer-readable recording medium for recording a program that can overcome deterioration of power control which is generated when a RTD time is longer than a power control command period in a closed-loop power control of the SAT-CDMA mobile communication system.

In accordance with one aspect of the present invention, there is provided a closed-loop power control apparatus that can compensate for round trip delay (RTD) in an up-link satellite channel of a satellite Code Division Multiple Access (SAT-CDMA) mobile communication system, the apparatus including: a power control level determining unit for determining a power control level based on a power control command transmitted from a base station; a channel variation rate estimation unit for estimating a channel variation rate based on received power of a pilot channel; a filter coefficient generation unit for generating a filter coefficient by using the channel variation rate; a compensation unit for receiving the power control level and compensating for the channel variation caused by the round trip delay; and a transmit power updating unit for updating transmit power by using the power control level received from the compensation unit.

In accordance with one aspect of the present invention, there is provided a closed-loop power control apparatus that can compensate for round trip delay (RTD) in a down-link satellite channel of a SAT-CDMA mobile communication system, the apparatus comprising: a power error computing unit for calculating a power error of a received signal; a channel variation rate estimation unit for estimating a channel variation rate based on received power of a pilot channel; a filter coefficient generation unit for generating a filter coefficient by using the channel variation rate; a channel variation amount estimation unit for estimating a channel variation amount after a loop delay time; a power error compensation unit for compensating for the power error by using the output of the channel variation rate estimation unit; and a power control command generation unit for generating a power control command based on the compensated power error.

In accordance with one aspect of the present invention, there is provided a closed-loop power control method that can compensate for round trip delay (RTD) in an up-link satellite channel of a SAT-CDMA mobile communication system, the method comprising the steps of: a) receiving power of a pilot channel and a power control command; b) estimating a channel variation rate from the pilot channel power and generating a filter coefficient based on the channel variation rate; and c) compensating transmit power by using the filter coefficient.

In accordance with one aspect of the present invention, there is provided closed-loop power control method that can compensate for round trip delay (RTD) in a down-link satellite channel of a SAT-CDMA mobile communication system, the method comprising the steps of: a) receiving power of a pilot channel and a signal-to-interference ratio of a received signal; b) estimating a channel variation rate based on the pilot channel power and generating a filter coefficient based on the channel variation rate; and c) compensating a power error based on the filter coefficient.

In accordance with one aspect of the present invention, there is provided a computer-readable recording medium provided with a processor for recording a program that implements a closed-loop power control method which can compensate for round trip delay in an up-link satellite channel of a SAT-CDMA mobile communication system, the closed-loop power control method comprising the steps of: a) receiving power of a pilot channel and a power control command; b) estimating a channel variation rate from the pilot channel power and generating a filter coefficient based on the channel variation rate; and c) compensating transmit power by using the filter coefficient.

In accordance with one aspect of the present invention, there is provided a computer-readable recording medium provided with a processor for recording a program that implements a closed-loop power control method which can compensate for round trip delay in a down-link satellite channel of a SAT-CDMA mobile communication system, the closed-loop power control method comprising the steps of: a) receiving power of a pilot channel and a signal-to-interference ratio of a received signal; b) estimating a channel variation rate based on the pilot channel power and generating a filter coefficient based on the channel variation rate; and c) compensating a power error based on the filter coefficient.

BRIEF DESCRIPTION OF DRAWINGS

The above and other objects and features of the present invention will become apparent from the following description of the preferred embodiments given in conjunction with the accompanying drawings, in which.

BEST MODE FOR CARRYING OUT THE INVENTION

Other objects and aspects of the invention will become apparent from the following description of the embodiments with reference to the accompanying drawings, which is set forth hereinafter.

In a first embodiment, a closed-loop power control apparatus for a satellite. Code Division Multiple Access (SAT-CDMA) mobile communication system is described.

Embodiment 1

Loop delay compensation and channel estimation technologies for up-link and down-link closed loop power control in the SAT-CDMA mobile communication system are suggested in a first embodiment of the present invention. For this, in the technologies of the present invention, a round trip delay (RTD) time, which is also referred to as "a loop delay time", in the up-link power control is compensated for by performing filtering on a received power control command and controlling transmit power based on a value outputted from the filtering process.

In the SAT-CDMA mobile communication system, the RTD time ($T_{RTD}$) taken for a power control command generated in a base station to be reflected on the received power of the base station is very long, compared to a terrestrial communication system. Therefore, change in the power to be received in future, which corresponds to the RTD time ($T_{RTD}$), needs to be estimated in advance to effectively control the power of a satellite channel. The technology of the present invention estimates the future power error after the RTD time ($T_{RTD}$) in advance based on the recent change in power control commands by using a filter, and reflects the estimated power error on the transmit power.

Figure 1:
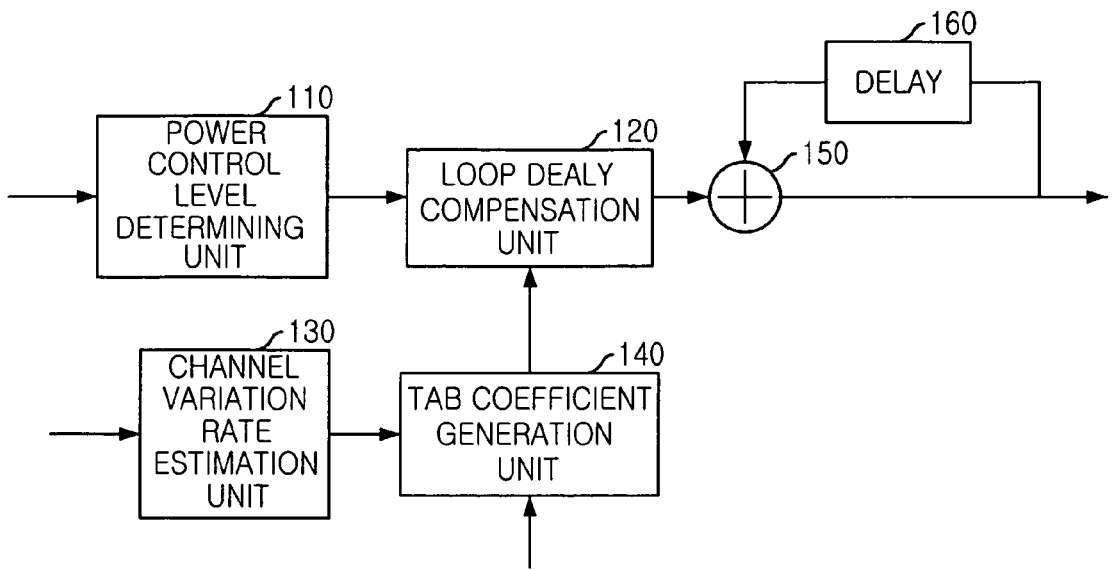
FIG. 1 is a block diagram showing a structure of an up-link closed-loop power control apparatus in a satellite Code Division Multiple Access (SAT-CDMA) mobile communication system in accordance with a first embodiment of the present invention.

FIG. 1 is a block diagram showing a structure of an up-link closed-loop power control apparatus in a SAT-CDMA mobile communication system in accordance with the first embodiment of the present invention. As illustrated in the drawing, the up-link closed-loop power control apparatus of the present invention includes a power control level determining unit 110, a loop delay compensation unit 120, a channel variation rate estimation unit 130, a filter coefficient generation unit 140, an adder 150 and a delay unit 160.

First, the power control level determining unit 110 determines a power control level based on a power control command transmitted from a base station (not shown).

The loop delay compensation unit 120 outputs a final power control level including channel variation after the loop delay time based on the power control level from the power control level determining unit 110. The loop delay compensation unit 120 will be described in detail later on, with reference to FIG. 2.

The channel variation rate estimation unit 130 receives power of a pilot channel and measures a channel variation rate. The channel variation rate estimation unit 130 will be described in detail later on, with reference to FIG. 3.

The filter coefficient generation unit 140 generates a filter coefficient of the loop delay compensation unit 120 based on the channel variation rate of the pilot channel power, which is outputted from the channel variation rate estimation unit 130, and the number of power control commands ($T_{RTD}/T_P$) during the loop delay time.

A filter coefficient can be also generated by using a Read-Only Memory (ROM) table. In this case, a filter coefficient is generated by directly calculating an optimum coefficient according to an equation or obtaining it according to a quantized channel variation rate, storing the optimum coefficient in a ROM table, and outputting a filter coefficient according to the channel variation rate. Here, the equation is obtained from experiments or analyses. The response from the loop delay compensation unit 120 can be made flexibly by controlling the filter coefficient based on the channel variation rate.

In the first embodiment of the present invention, the filter coefficient of the second filter 230 is 0, and the filter coefficient of the first filter 220 is generated from Equation 1 below. The first filter 220 has two tabs.

$$\text{Tab1} = \begin{cases} Gp1 & \text{if channel alteration rate} > T \\ 1 & \text{otherwise} \end{cases} \quad \text{Eq. 1}$$

$$\text{Tab2} = \begin{cases} -Gp2 & \text{if channel alteration rate} > T \\ 1 & \text{otherwise} \end{cases}$$

Here, Gp1 and Gp2 are gains of the first filter, and T is a threshold of a channel variation rate.

The adder 150 receives a previous transmit power from the delay unit 160 and updates the present transmit power based on the increase/decrease of the actual transmit power received from the loop delay compensation unit 120.

Figure 2:
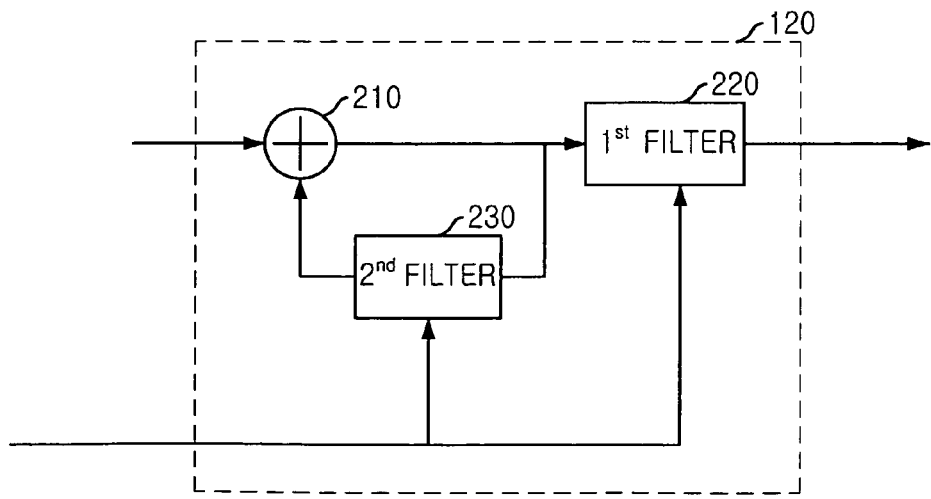
FIG. 2 is a structural diagram showing a loop delay compensation unit of FIG. 1 in accordance with the first embodiment of the present invention.

FIG. 2 is a structural diagram showing a loop delay compensation unit of FIG. 1 in accordance with the first embodiment of the present invention. As shown in the drawing, the loop delay compensation unit 120 of the present invention includes a first adder 210, a first filter 220 and a second filter 230. The first and second filters may be discrete linear filters. More specifically, they may be finite impulse response (FIR) filters.

The loop delay compensation unit 120 of the present invention uses two filters: a first filter 220 for feed forward and a second filter 230 for feed back. However, more filters may be used for more accurate loop delay compensation.

Figure 3:
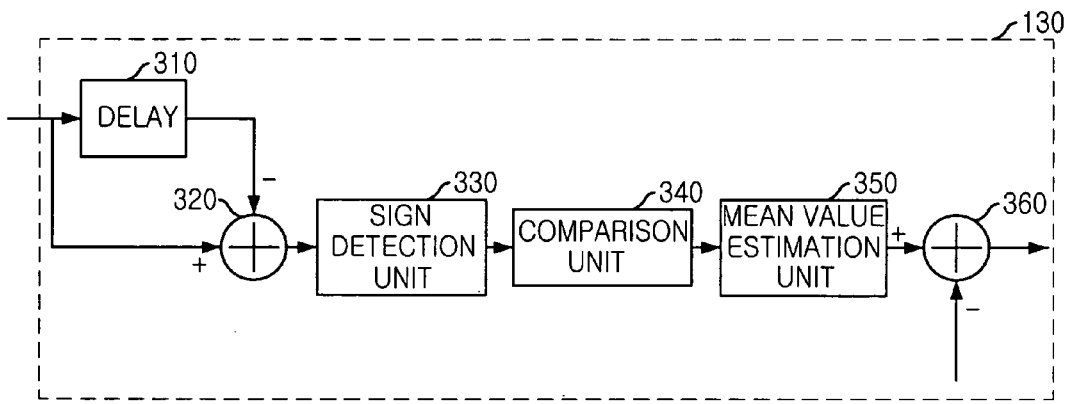
FIG. 3 is a structural diagram showing a channel variation rate estimation unit of FIG. 1 in accordance with the first embodiment of the present invention.

FIG. 3 is a structural diagram showing a channel variation rate estimation unit of FIG. 1 in accordance with the first embodiment of the present invention. As illustrated in the drawing, the channel variation rate estimation unit 130 of the present invention includes a delay unit 310, a second adder 320, a sign detection unit 330, a comparison unit 340, a mean value estimation unit 350, and a third adder 360.

The delay unit 310 receives power of a pilot channel, and delays it by m sample. Here, m is a natural number and arbitrarily selected by a user.

The second adder 320 calculates the difference between the power of the pilot channel and the output of the delay unit 310. That is, the output of the second adder 320 is a gradient of the pilot channel power.

The sign detection unit 330 detects out if the sign of an output of the second adder 320 is altered based on Equation 2.

$$\text{Sign}(x) = 1, \quad x > 0 \quad \text{Eq. 2}$$
$$0, \quad \text{otherwise}$$

The comparison unit 340 compares the sign of the pilot channel power, which is the output of the sign detection unit 330, with the sign of an output n sample (n being a natural number) before the output of the sign detection unit 330. Then, if both are the same, it outputs '1', or if both are not the same, it outputs '0'.

The number of output '1' is increased, as the correlative value of the sign alteration of the continued gradient of the pilot channel power becomes large.

The mean value estimation unit 350 calculates a mean value of the sign alteration of the gradient during a w sample period (w being a natural number). The third adder 360 obtains the difference between the output of the mean value estimation unit 350 and 0.5. The same result is obtained by counting the number of output '1' in the w sample period (w being a natural number) and calculating the difference between the number of output '1' and w/2 in the third adder 360.

The present invention changes the transfer function characteristic of a power control loop and compensates for loop delay by filtering a power control command received and controlling the transmit power as much as the output of the filtering.

Embodiment 2

In a second embodiment of the present invention, an up-link closed-loop power control method for a SAT-CDMA mobile communication system is described in detail.

Figure 4:
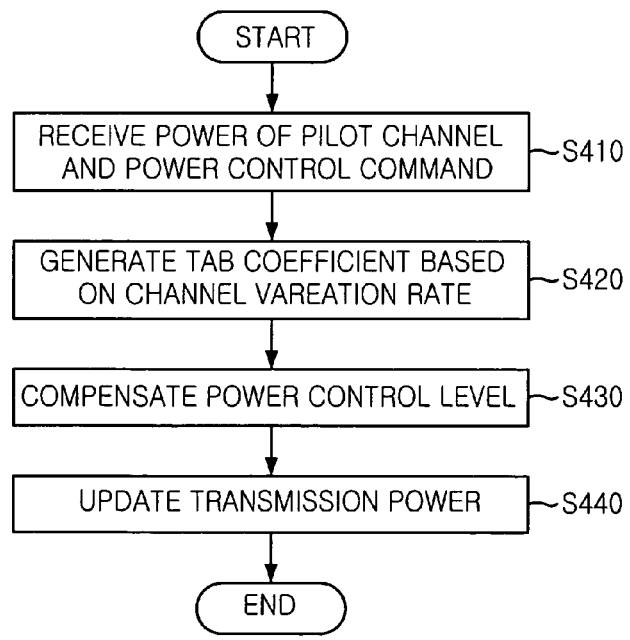
FIG. 4 is a flow chart describing an up-link closed-loop power control method in the SAT-CDMA mobile communication system in accordance with a second embodiment of the present invention.

FIG. 4 is a flow chart describing an up-link closed-loop power control method in the SAT-CDMA mobile communication system in accordance with the second embodiment of the present invention. As illustrated in the drawing, at step S410, the power of a pilot channel and a power control command are received. A channel variation rate is estimated by using the pilot channel power, and at step S420, a filter coefficients are generated based on the channel variation rate.

At step S430, the power control command determines a power control level, and the power control level pass a filter with the filter coefficients obtained above. Finally, at step S440, a transmit power is updated by using the previous transmit power and the filtered power control level.

The method of the present invention described above can be embodied as a program and recorded in a computer-readable recording medium, such as CD-ROM, RAM, ROM, floppy disks, hard disks, optical-magnetic disks and the like.

The present invention changes the transfer function characteristic of a power control loop and compensates the loop delay by performing filtering on a power control command received with respect to the up-link power control and controlling the transmit power as much as the output of the filtering.

Embodiment 3

In a third embodiment of the present invention, a down-link closed-loop power control method for a SAT-CDMA mobile communication system is described in detail.

Figure 5:
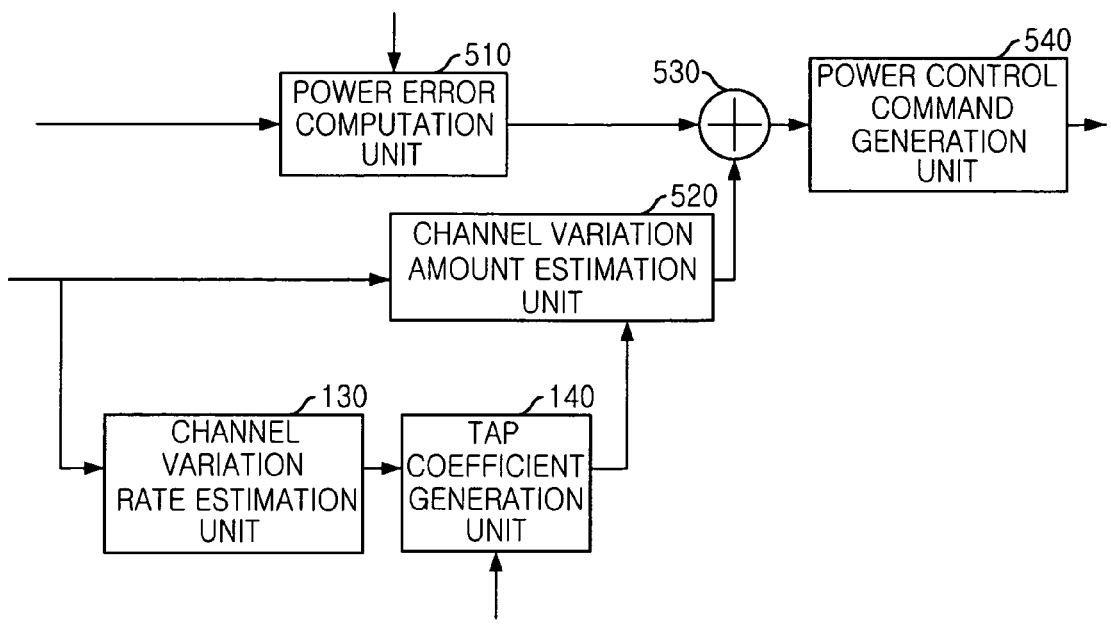
FIG. 5 is a structural diagram depicting a down-link closed-loop power control apparatus in the SAT-CDMA mobile communication system in accordance with a third embodiment of the present invention.

FIG. 5 is a structural diagram depicting a down-link closed-loop power control apparatus in the SAT-CDMA mobile communication system in accordance with the third embodiment of the present invention. As illustrated in the drawing, the down-link closed-loop power control apparatus includes a power error computing unit 510, a channel variation rate estimation unit 130, a filter coefficient generation unit 140, a channel variation amount estimation unit 520, an adder 530, and a power control command generation unit 540.

The power error computing unit 510 calculates a power error, i.e., the difference between a received signal-to-interference ratio (SIR) and a reference SIR.

The channel variation rate estimation unit 130 receives the power of a pilot channel and measures a channel variation rate.

The filter coefficient generation unit 140 generates a filter coefficient of the channel variation amount estimation unit 520 by using the channel variation rate of the pilot channel power, which is calculated by the channel variation rate estimation unit 130, and the number of power control commands ($T_{RTD}/T_P$) during a loop delay time.

The channel variation amount estimation unit 520 estimates a channel variation amount after the loop delay time by using the received power of the pilot channel. It can be embodied in the same structure as the loop delay compensation unit 120 of FIG. 2.

The adder 530 adds the channel variation amount to the power error and performs compensation for the power error.

The power control command generation unit 540 generates a power control command by using the compensated power error. The present invention estimates a power error after a loop delay time in advance for down-link power control and generates a power control command based on the estimated power error to thereby compensate for the loop delay.

Embodiment 4

In a fourth embodiment of the present invention, a down-link closed-loop power control method for a SAT-CDMA mobile communication system is described in detail.

Figure 6:
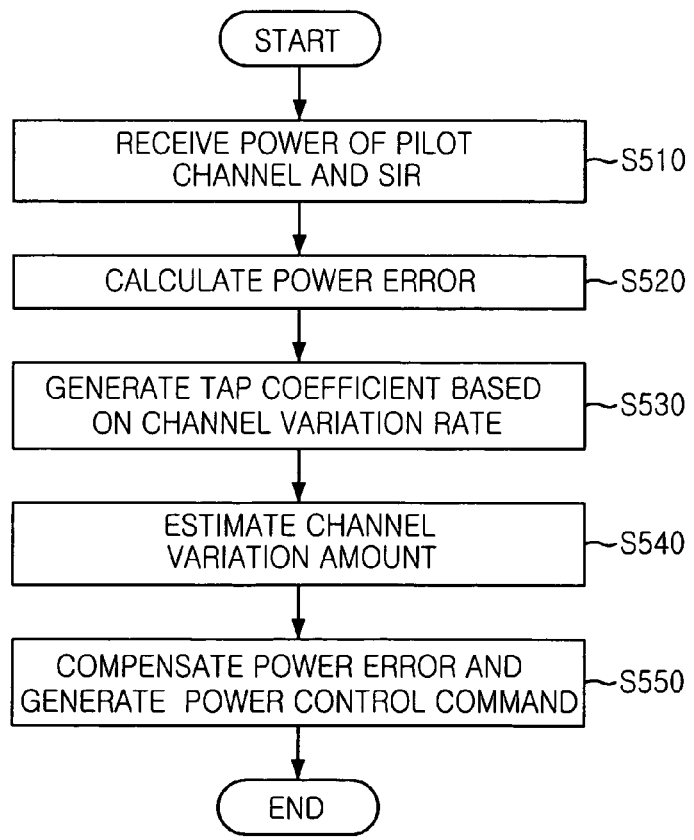
FIG. 6 is a flow chart illustrating a down-link closed-loop power control method in the SAT-CDMA mobile communication system in accordance with a fourth embodiment of the present invention.

FIG. 6 is a flow chart illustrating a down-link closed-loop power control method in the SAT-CDMA mobile communication system in accordance with the fourth embodiment of the present invention. As illustrated in the drawing, first at step S510, the power of a pilot channel and SIR are received. Then, at step S520, a power error is estimated using the SIR, and a channel variation rate is estimated based on the pilot channel power. At step S530, a filter coefficient is generated using the channel variation rate.

At step S540, a channel variation amount is estimated from the received power of the pilot channel by using a filter with the filter coefficients obtained above. Subsequently, at step S550, the power error is modified by reflecting the channel variation amount thereto, and a power control command is generated by using the modified power error.

The method of the present invention described above can be embodied as a program and recorded in a computer-readable recording medium, such as CD-ROM, RAM, ROM, floppy disks, hard disks, optical-magnetic disk and the like.

The present invention calculates a power error-to-be after a loop delay time in advance with respect to down-link power control and generates a power control command based on the estimated power error to thereby compensate for the loop delay.

While the present invention has been described with respect to certain preferred embodiments, it will be apparent to those skilled in the art that various changes and modifications may be made without departing from the scope of the invention as defined in the following claims.

What is claimed is:

1. A closed-loop power control apparatus that can compensate for round trip delay (RTD) in an up-link satellite channel of a satellite Code Division Multiple Access (SAT-CDMA) mobile communication system, the apparatus comprising:

a power control level determining means for determining a power control level based on a power control command transmitted from a base station;

a channel variation rate estimation means for estimating a channel variation rate based on received power of a pilot channel;

a filter coefficient generation means for generating a filter coefficient by using the channel variation rate;

a compensation means for receiving the power control level and compensating for the channel variation caused by the round trip delay; and a transmit power updating means for updating transmit power by using the power control level received from the compensation means.

2. The apparatus as recited in claim 1, wherein the transmit power updating means includes:

a sample delay means for delaying the output of the compensation means by 1 sample substantially; and an adding means for adding the output of the compensation means and the output of the sample delay means.

3. A closed-loop power control apparatus that can compensate for round trip delay (RTD) in a down-link satellite channel of a SAT-CDMA mobile communication system, the apparatus comprising:

a power error computing means for calculating a power error of a received signal;

a channel variation rate estimation means for estimating a channel variation rate based on received power of a pilot channel;

a filter coefficient generation means for generating a filter coefficient by using the channel variation rate;

a channel variation amount estimation means for estimating a channel variation amount after a loop delay time;

a power error compensation means for compensating for the power error by using the output of the channel variation rate estimation means; and a power control command generation means for generating a power control command based on the compensated power error.

4. The apparatus as recited in claim 3, wherein the power error computing means calculates the difference between a signal-to-interference ratio (SIR) of the received signal and a reference SIR.

5. The apparatus as recited in claim 1 or 3, wherein the channel variation rate estimation means includes:

a first delay means for receiving the pilot channel power and delaying the pilot channel power by m sample, m being a natural number;

a first computing means for calculating a gradient of the pilot channel power based on the pilot channel power and the output of the first delay means;

a sign alteration detection means for detecting sign alteration of the output of the first computing means;

a comparison means for comparing the sign of the output of the sign alteration detection means and the sign of an output which is n sample before the output of the sign alteration detection means, n being a natural number, and outputting a comparison result;

a mean estimation means for estimating a mean value of the signal alteration of the gradient of the pilot channel power during a w sample period, w being a natural number; and a second computing means for calculating a channel variation rate based on the output of the mean estimation means.

6. The apparatus as recited in claim 5, wherein the first computing means calculates the gradient of the pilot channel power by subtracting the output of the first delay means from the pilot channel power.

7. The apparatus as recited in claim 5, wherein the sign alteration detection means detects alteration in the sign of the output of the first computing means based on an equation as:

$$\text{Sign}(x) = 1, \quad x > 0$$
$$0, \quad \text{otherwise.}$$

8. The apparatus as recited in claim 5, wherein the comparison means compares the sign of the output of the sign alteration detection means and the sign of an output n sample before the output of the sign alteration detection means, and if the both are the same, outputs '1', or if the both are not the same, outputs '0'.

9. The apparatus as recited in claim 8, wherein the larger the correlation value of the sign alteration of the continued gradient of the pilot channel becomes, the more '1' is outputted from the comparison means.

10. The apparatus as recited in claim 5, wherein the mean estimation means estimates the mean of the output of the comparison means during a w sample period.

11. The apparatus as recited in claim 10, wherein the second computing means subtracts 0.5 from the output of the mean estimation means substantially.

12. The apparatus as recited in claim 5, wherein the mean estimation means estimates the number of '1' outputted from the comparison means during a w sample period.

13. The apparatus as recited in claim 12, wherein the second computing means subtracting w/2 from the output of the mean estimation means.

14. The apparatus as recited in claim 1 or 3, wherein the compensation means and the channel variation amount estimation means include:
   a first filter for feedforward;
   a second filter for feedback; and
   a third computing means for calculating the output of the power control level determining means and the output of the second filter.

15. The apparatus as recited in claim 14, wherein the first and second filters are discrete linear filters.

16. The apparatus as recited in claim 15, wherein the first and second filters are finite impulse response (FIR) filters.

17. The apparatus as recited in claim 14, wherein if the first filter has two tabs, the filter coefficients are generated based on an equation as:

$$\text{Tab1} = \begin{cases} Gp1 & \text{if channel alteration rate} > T \\ 1 & \text{otherwise} \end{cases}$$

$$\text{Tab2} = \begin{cases} -Gp2 & \text{if channel alteration rate} > T \\ 1 & \text{otherwise,} \end{cases}$$

wherein Gp1 and Gp2 are gains of the first filter, and T is a threshold of the channel variation rate.

18. The apparatus as recited in claim 14, wherein the filter coefficient of the second filter is 0 substantially.

19. The apparatus as recited in claim 1 or 3, wherein the filter coefficient generation means generates an optimum filter coefficient based on the channel variation rate in a pre-stored memory table.

20. A closed-loop power control method that can compensate for round trip delay (RTD) in an up-link satellite channel of a SAT-CDMA mobile communication system, the method comprising the steps of:
   a) receiving power of a pilot channel and a power control command;
   b) estimating a channel variation rate from the pilot channel power and generating a filter coefficient based on the channel variation rate; and
   c) compensating transmit power by using the filter coefficient.

21. The method as recited in claim 20, further comprising the step of:
   d) updating the transmit power.

22. A closed-loop power control method that can compensate for round trip delay (RTD) in a down-link satellite channel of a SAT-CDMA mobile communication system, the method comprising the steps of:
   a) receiving power of a pilot channel and a signal-to-interference ratio of a received signal;
   b) estimating a channel variation rate based on the pilot channel power and generating a filter coefficient based on the channel variation rate; and
   c) compensating a power error based on the filter coefficient.

23. The method as recited in claim 22, further comprising the step of:
   d) calculating the power error based on the received SIR.

24. The method as recited in claim 22, further comprising the step of:
   d) generating a power control command based on the compensated power error.

25. A computer-readable recording medium for recording a program that implements a closed-loop power control method which can compensate for round trip delay in an up-link satellite channel of a SAT-CDMA mobile communication system, the method comprising the steps of:
   a) receiving power of a pilot channel and a power control command;
   b) estimating a channel variation rate from the pilot channel power and generating a filter coefficient based on the channel variation rate; and
   c) compensating transmit power by using the filter coefficient.

26. A computer-readable recording medium provided with a processor for recording a program that implements a closed-loop power control method which can compensate for round trip delay in a down-link satellite channel of a SAT-CDMA mobile communication system, the method comprising the steps of:
   a) receiving power of a pilot channel and a signal-to-interference ratio of a received signal;
   b) estimating a channel variation rate from the pilot channel power and generating a filter coefficient based on the channel variation rate; and
   c) compensating a power error based on the filter coefficient.

* * * * *